US011715961B2

(12) United States Patent
Veselic

(10) Patent No.: US 11,715,961 B2
(45) Date of Patent: Aug. 1, 2023

(54) HYBRID BATTERY SYSTEM AND METHOD

(71) Applicant: FUNDAMENTAL INNOVATION SYSTEMS INTERNATIONAL LLC, Flower Mound, TX (US)

(72) Inventor: Dusan Veselic, Oakville (CA)

(73) Assignee: FUNDAMENTAL INNOVATION SYSTEMS INTERNATIONAL LLC, Flower Mound, TX (US)

( * ) Notice: Subject to any disclaimer, the term of this patent is extended or adjusted under 35 U.S.C. 154(b) by 390 days.

(21) Appl. No.: 17/107,268

(22) Filed: Nov. 30, 2020

(65) Prior Publication Data

US 2021/0167608 A1    Jun. 3, 2021

Related U.S. Application Data

(60) Provisional application No. 62/942,955, filed on Dec. 3, 2019.

(51) Int. Cl.
*H02J 7/00* (2006.01)
*H02M 3/158* (2006.01)

(52) U.S. Cl.
CPC ...... *H02J 7/0013* (2013.01); *H02J 7/007194* (2020.01); *H02M 3/158* (2013.01); *H02J 2207/20* (2020.01)

(58) Field of Classification Search
USPC .......................... 320/108, 114, 132, 134, 136
See application file for complete search history.

(56) References Cited

U.S. PATENT DOCUMENTS

2010/0164278 A1 * 7/2010 Oyobe .................. H02M 1/36
307/9.1

| 2014/0111120 | A1 * | 4/2014 | Mitsutani | B60L 58/21 318/139 |
| 2016/0380455 | A1 * | 12/2016 | Greening | H02J 1/102 320/114 |
| 2017/0264228 | A1 * | 9/2017 | Kazuno | H02M 3/158 |
| 2020/0269707 | A1 * | 8/2020 | Oi | B60L 3/003 |

OTHER PUBLICATIONS

Switching Power Supply Design, 3rd Edition by Abraham Pressman, Keith Billings and Taylor Morey, Copyright 2009, McGraw-Hill.

* cited by examiner

*Primary Examiner* — Brian Ngo
(74) *Attorney, Agent, or Firm* — Botos Churchill IP Law

(57) ABSTRACT

A switching-mode power system and method utilizing a rechargeable primary higher-current density energy cell and a rechargeable secondary lower-current density cell are disclosed. The system and method employ a collection of switches that are dynamically actuated so as to selectively interconnect and repurpose a minimal arrangement of components. This facilitates the selective provision of power to a portable device or system from a rechargeable primary high-current density energy cell or a rechargeable secondary lower-current density cell. In addition, by selectively actuating the switches, the switching-mode power supply is enabled to a) permit the secondary lower-current density cell to quickly attain a charge level suitable for device/system operation when connected to a charging station/power source, b) charge the primary high-current density energy cell, and c) employ the charged secondary lower-current density cell to charge the primary high-current density energy cell when disconnected from the charging station/power source.

22 Claims, 7 Drawing Sheets

HYBRID BATTERY SYSTEM AND METHOD

CROSS REFERENCE TO RELATED APPLICATION

The present application claims the benefit of the filing date of U.S. Provisional Application No. 62/942,955, filed Dec. 3, 2019, the disclosure of which is incorporated by reference.

BACKGROUND OF THE INVENTION

The utilization of high current density batteries has increased in recent years to support the rising demand for portable smart devices (phones, tablets, laptop computers, etc.), and electric vehicles (both plug-in and hybrid combustion engine). All of these applications presently rely primarily upon Lithium-Ion ("Li-Ion") battery technology. Li-Ion batteries provide a high current density, but require rather long periods of time to be charged to full capacity. These typical charging times may range from close to an hour (for batteries charged at 1 C rate) to multiple hours (for larger capacity batteries where 1C charge rate can't easily be accommodated).

Supercapacitors ("SCs"), which are also known as ultra-capacitors, offer an alternative to Li-Ion batteries. Typically, SCs offer current densities of only about 25% that of the current densities of a Li-Ion batteries. In other words, an SC would have to occupy approximately four times the volume of a Li-Ion battery to store a given amount of energy. This low-density characteristic makes SCs unsuitable for use as a primary power source in devices having high-current demands (i.e., smart phones, tablets, laptops, electric vehicles, etc.). Rather, SCs are typically utilized in devices that are used sporadically and draw lower peak currents. A portable UPC scanner would be an example of such a device. However, SCs do offer the advantage of very fast recharging in comparison to Li-Ion batteries. This ability to be charged to full, or almost full, capacity in a matter of seconds or a few minutes makes SCs ideal for applications requiring fast energy capture and storage, such as recouping energy from vehicle braking.

Known technologies offer hybrid power systems employing both Li-Ion batteries and SCs in a tandem arrangement. These include hybrid Li-Ion/SC energy storage devices that are used as controllers adapted to govern the charging of and power supplied from a combination of Li-Ion batteries and SCs. However, these technologies are ill-suited to meet the needs of compact portable high-current systems that require the ability to attain a stored energy level suitable for device/system operation in a short period of time (seconds or a very few minutes).

BRIEF SUMMARY OF THE INVENTION

The present invention provides a switching-mode power system and method utilizing a rechargeable primary higher-current density energy cell and a rechargeable secondary lower-current density cell. The system and method employ a collection of switches that are dynamically actuated so as to selectively interconnect and repurpose a minimal arrangement of components. This facilitates the selective provision of power to a portable device or system from a rechargeable primary high-current density energy cell or a rechargeable secondary lower-current density cell. In addition, by selectively actuating the switches, the switching-mode power supply is enabled to a) permit the secondary lower-current density cell to quickly attain a charge level suitable for device/system operation when connected to a charging station/power source, b) charge the primary high-current density energy cell, and c) employ the charged secondary lower-current density cell to charge the primary high-current density energy cell when disconnected from the charging station/power source. This minimizes the period of time a portable device/system must be tethered to a charging station/power source in order to achieve a charge level sufficient for supporting portable operation, and it enables the charging of the primary high-current density cell after the device/system has been disconnected from a charging station/power source.

BRIEF DESCRIPTION OF THE DRAWINGS

The aspects, and advantages of the present invention will become better understood with regard to the following description, appended claims, and accompanying drawings in which:

SWITCH MODE POWER SYSTEM OVERVIEW

The operation of switch mode power systems, including the modulation of high (buck) and low (boost) switches so as to provide a regulated supply of power, is well-known in the art (see, for example, Switching Power Supply Design, 3rd Edition by Abraham Pressman, Keith Billings and Taylor Morey, Copyright 2009, McGraw-Hill). However, so as to establish a common lexicography, a brief overview of the buck and the boost modes of operation is provided below.

Figure 1A:
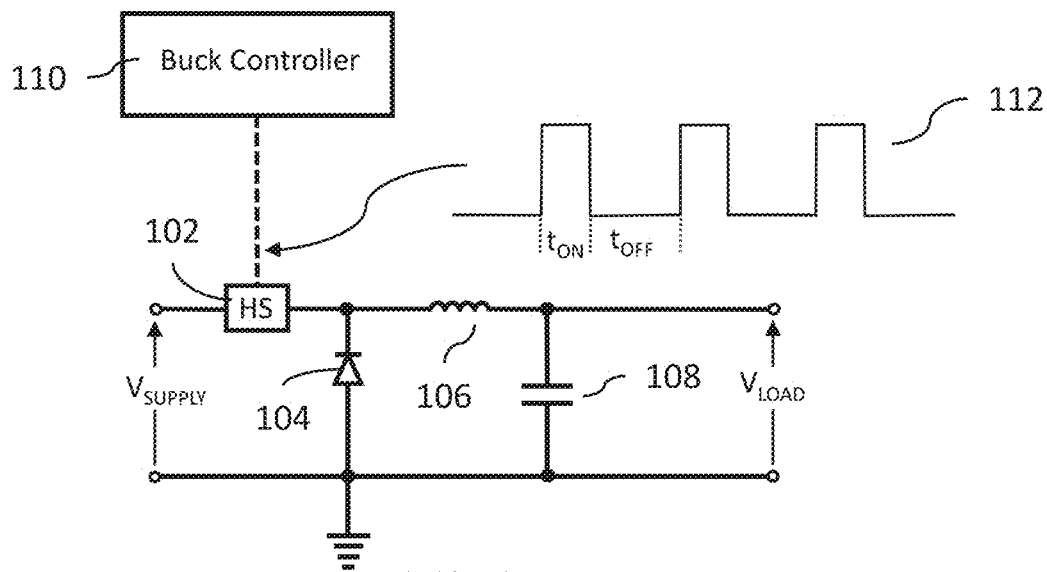
FIG. 1A is a schematic diagram illustrating the buck functionality of a switch mode power system.

FIG. 1A provides a schematic diagram of a circuit illustrating the buck functionality of a switch mode power system. The circuit consists of high switch (HS) 102, diode 104, inductor 106, capacitor 108 and buck controller 110. The buck controller 110 has two operating states; one where HS 102 is "on" (and is in a conducting state), and one where HS 102 is "off" (and is in a non-conductive state). The state of the HS 102 is controlled by buck controller 110, which modulates the state of HS 102 as illustrated by waveform 112. When the HS 102 is "on", diode 104 is reverse biased and voltage $V_{SUPPLY}$ causes current to flow through inductor 106 to a load. This also charges capacitor 108. The current flow through inductor 106 induces a voltage having an opposite polarity to $V_{SUPPLY}$, which inhibits the flow of current to the load, until HS 102 is switched off or a steady state is attained. As buck controller 110 causes HS 102 to be placed in an "off" state, $V_{SUPPLY}$ is disconnected from the circuit, which causes the magnetic field about inductor 106 to collapse thereby inducing a reverse voltage which serves to forward bias diode 104, and cause energy that had been stored in inductor 106 to dissipate as current through the load. This current flow continues until the energy is fully dissipated or HS 102 is placed back in an "on" state. The output voltage, $V_{LOAD}$ is therefore determined as a function of the $t_{ON}/t_{OFF}$ ratio as shown below:

$$V_{LOAD} = V_{SUPPLY}\left[\frac{t_{ON}}{t_{ON} + t_{OFF}}\right]$$

Regulation of $V_{LOAD}$ is achieved by varying the $t_{ON}:t_{OFF}$ ratio, with $V_{LOAD}$ always being less than or equal to $V_{SUPPLY}$.

Figure 1B:
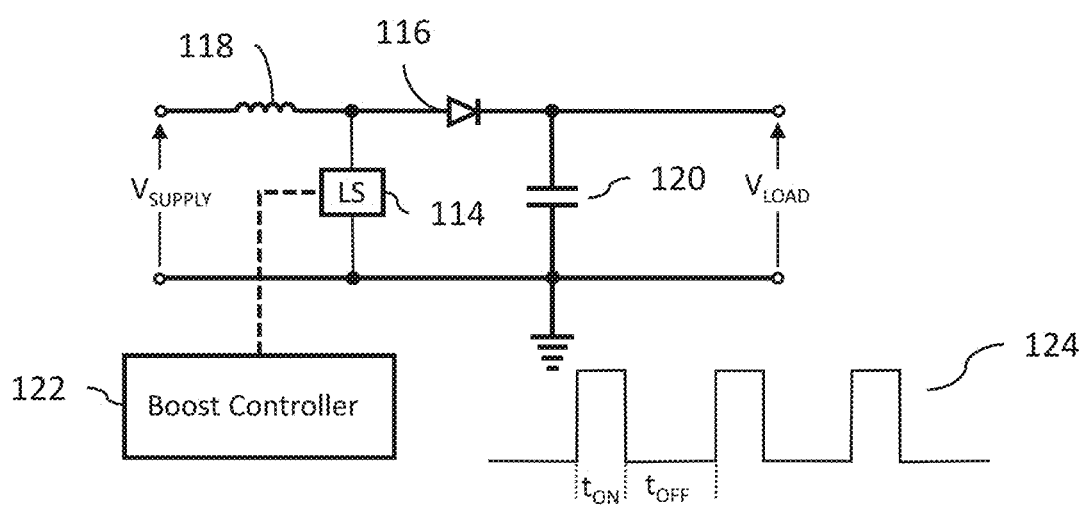
FIG. 1B is a schematic diagram illustrating the boost functionality of a switch mode power system.

FIG. 1B is a schematic of a circuit illustrating the boost functionality of a switch mode power system. The circuit consists of low switch (LS) 114, diode 116, inductor 118, capacitor 120 and boost controller 122. As shown, LS 114 is situated so as to provide a path to ground when in an "on" state. The state of LS 114 is modulated by boost controller 122 in accordance with waveform 124. When the LS 114 is "on," current induced by $V_{SUPPLY}$ passes through inductor 118 to ground. This also effectively connects the anode of diode 116 to ground, placing the device in a reverse bias state, and allows capacitor 120 to dissipate through the load. If LS 114 is placed in an "off" state, $V_{SUPPLY}$ is connected to the load via diode 116 (now forward-biased). The current flow through inductor 118 decreases (the path to ground via LS 114 having been removed). As the associated magnetic field about the inductor collapses, the stored energy of inductor 118 is transferred to the load via diode 116. This effectively adds to $V_{SUPPLY}$ thereby boosting the $V_{LOAD}$ to a value greater than $V_{SUPPLY}$. The value of $V_{LOAD}$ being a function of:

$$V_{LOAD} = V_{SUPPLY}\left[1 \Big/ \left(1 - \left(\frac{t_{ON}}{t_{ON} + t_{OFF}}\right)\right)\right]$$

Regulation of $V_{LOAD}$ is achieved by varying the $t_{ON}:t_{OFF}$ ratio, with $V_{LOAD}$ always being greater than or equal to $V_{SUPPLY}$.

DETAILED DESCRIPTION

Figure 2A:
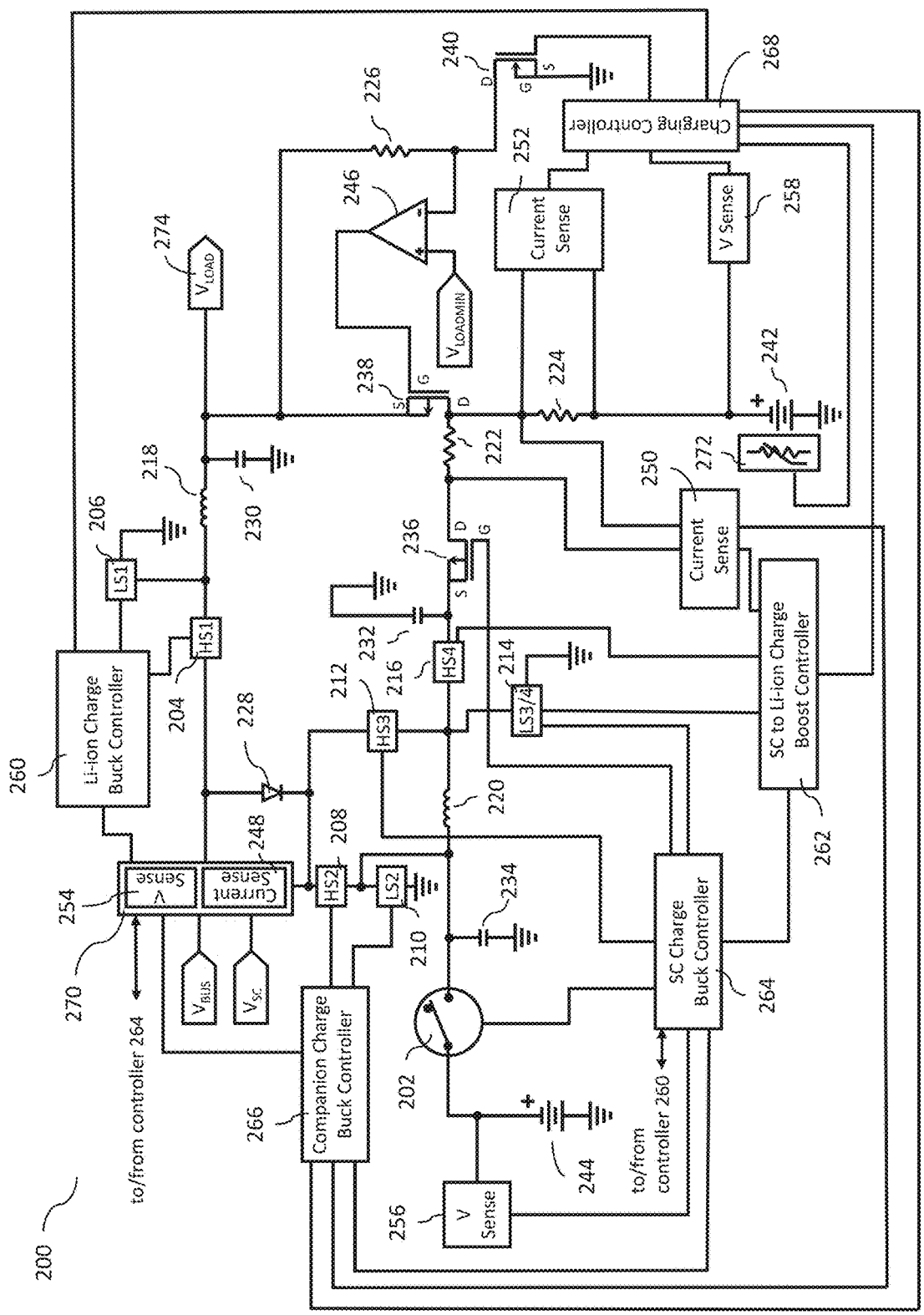
FIG. 2A is a schematic diagram of a preferred embodiment of a hybrid battery system.

FIG. 2A is a schematic of a switch-mode power system 200 employing a collection of switches (202, 204, 206, 208, 210, 212, 214, and 216) that are dynamically-actuated so as to selectively interconnect and repurpose a minimal arrangement of components. These components include inductors 218 and 220, resistors 222, 224 and 226, diode 228, capacitors 230, 232 and 234, field effect transistors 236, 238 and 240, lithium-ion ("Li-ion") battery 242, SC 244, and comparator 246. In addition, the power system also includes current sensors 248, 250 and 252, voltage sensors 254, 256 and 258, controllers 260, 262, 264, 266, 268 and 270, and temperature sensor 272. The controllers are subsystems, controlled by one or more processors or dedicated logic systems, and adapted to manage the charging, discharging and regulation of switch mode power systems. The dynamically-actuated switches are labeled as "high" switches (HSx) or "low" switches (LSx). The low switches are configured to selectively connect a voltage to ground, a functionality associated with the boost mode of switch mode power systems. The high switches are configured to selectively connect a voltage to ground, a state functionality associated with the buck mode of switch mode power systems. As is known in the art, regulation within a switch mode power system is achieved through the controlled modulation of the high and low switches.

Figure 2B:
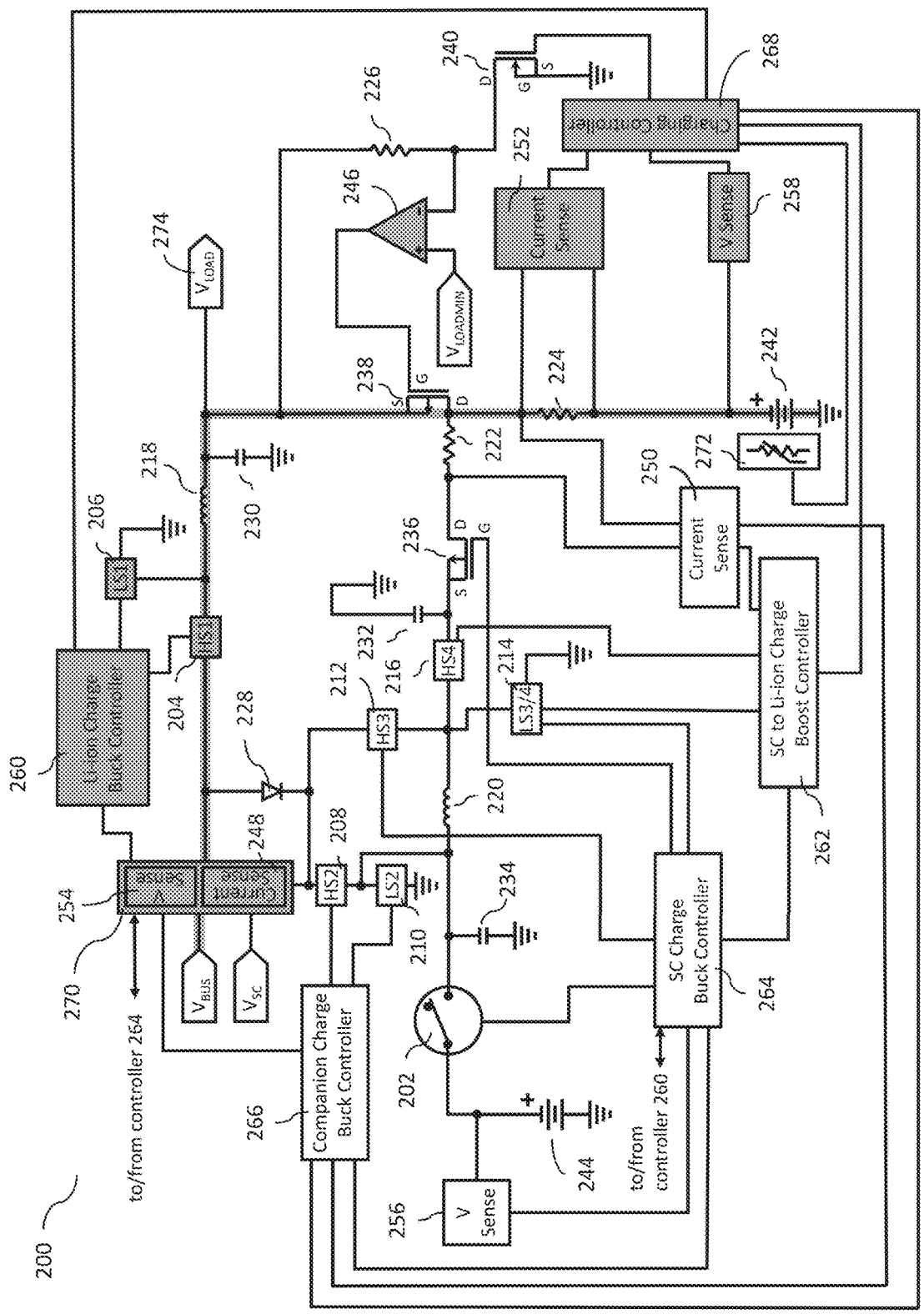
FIG. 2B is a schematic diagram illustrating a configuration of the switch-mode power system of FIG. 1 that enables the charging of the Li-ion battery.

FIG. 2B shows a configuration of switch-mode power system 200 wherein a path to enable the charging of Li-ion battery 242 is established. Li-ion charge buck controller 260 instructs supply voltage controller 270 to connect $V_{BUS}$ to the input of switch HS1 (204). Switches HS1 (204) and LS1 (206) are then modulated by Li-ion charge buck controller 260 to regulate the voltage evident at inductor 218 and the current allowed to flow through inductor 218 to the source of p-channel FET 238. Capacitor 230 serves to smooth the regulated voltage at the source of p-channel FET 238. Charging controller 268 operates to switch n-channel FET 240 OFF so as to allow $V_{LOAD}$ voltage to be presented at the negative terminal of comparator 246. The $V_{LOAD}$ voltage, when compared to a minimum load voltage, results in a voltage at the output of comparator 246 which drives the gate of p-channel FET 238. This places p-channel FET 238 in a conductive state, thereby permitting current flow through current-sense resistor 224 and into the positive terminal of Li-ion battery 242. Throughout the charging process switches HS1 (204) and LS1 (206) are controlled by Li-ion charging buck controller in accordance with known switch mode power system conventions so as to maintain an acceptable charging voltage level. The current passing through current sensing resistor 224 is monitored by charging controller 268 during the charging of Li-ion battery 242. This serves to enable charging controller 268 to monitor and modulate the current flowing through p-channel FET 238 via comparator 246. The current level is a function of the properties and capacity of Li-ion battery 242. Charging controller 268 may also receive information from a thermistor or other temperature sensing device 272 positioned to monitor the temperature of Li-ion battery 242, enabling the power delivered to battery 242 to be modulated as a function of battery temperature.

Figure 2C:
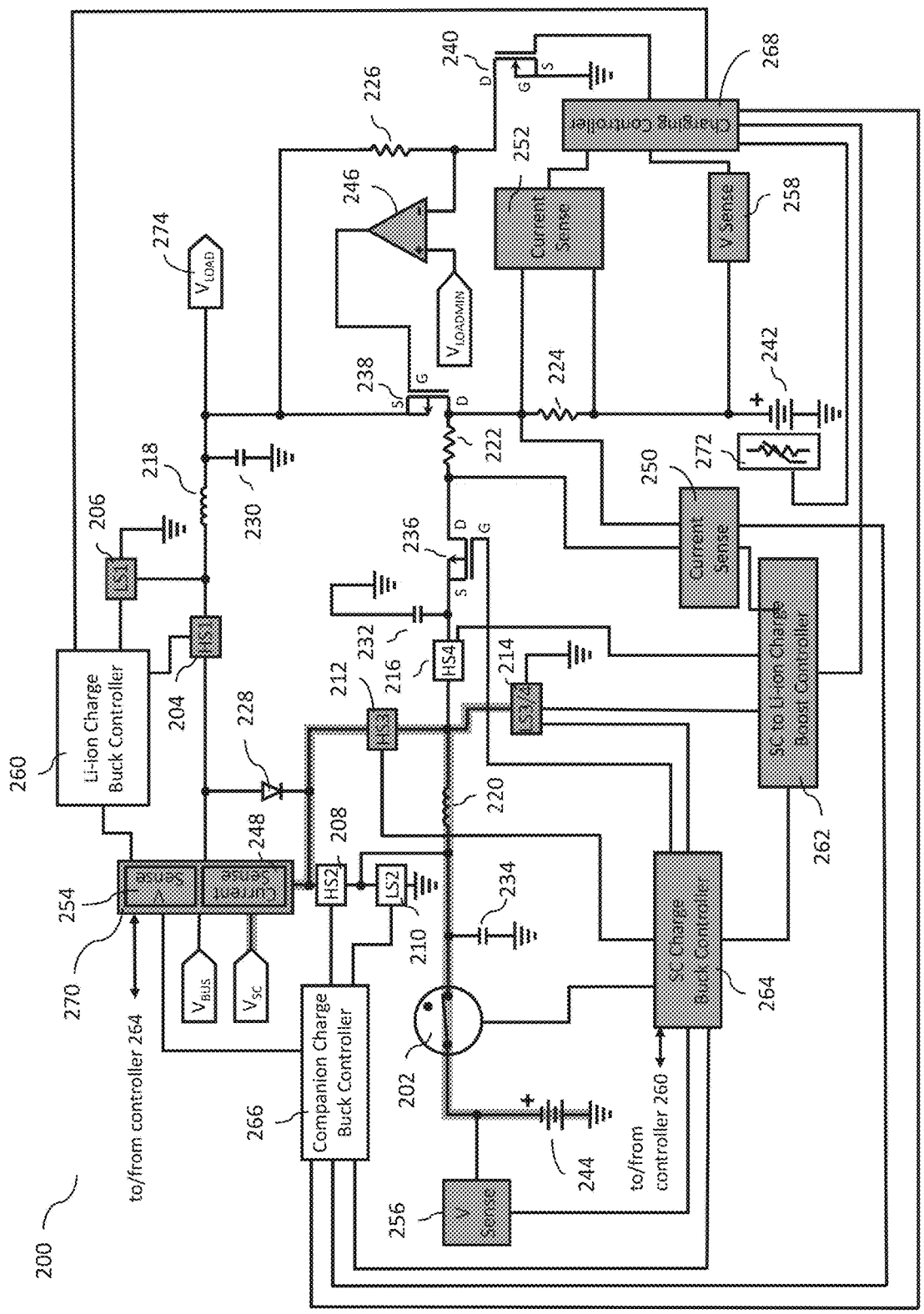
FIG. 2C is a schematic diagram illustrating the configuration of the switch-mode power system of FIG. 1 that enables the charging of the SC.

FIG. 2C illustrates a configuration of switch-mode power system 200 for charging SC 244. SC charge buck controller 264 instructs supply voltage controller 270 to connect $V_{SC}$ to the input of HS3 (212) and instructs SC-Li-ion Charge Boost Controller 262 to place switch HS4 (216) and FET 236 in an "off" state. Switch 202 is closed and switches HS3 (212) and LS3/4 (214) are modulated by SC charge buck controller 264 to regulate the voltage evident at inductor 220 and the current allowed to flow through inductor 220 and switch 202 to positive terminal SC 244. Capacitor 234 serves to smooth the voltage at the positive terminal of SC 244. Throughout the charging process switches HS3 (212) and LS3/4 (214) are modulated by SC charge buck controller 264 in accordance with known switch mode power system conventions so as to maintain an acceptable charging voltage level. The current flowing from $V_{SC}$ is monitored by SC charging controller 264 via 270 sensing circuitry during the charging of SC 244, and the voltage evident at the positive terminal of SC 244 is monitored by SC charge buck controller 264 via voltage sensor 256. This enables charging controller 264 to monitor and modulate the power flowing into SC 244. Charging controller 264 may also receive information from a thermistor or other temperature sensing device (connection not illustrated) positioned to monitor the temperature of Li-ion battery 242, enabling the power delivered to battery 242 to be modulated as a function of that sensed temperature.

It is significant that the disclosed invention can simultaneously enable the charging paths depicted in FIGS. 2B and 2C. This enables the simultaneous charging of both Li-ion battery 242 and SC 244. Utilizing this dual charging system can simultaneously enable SC 244 to quickly attain a charge level that could be utilized for further charging the Li-ion battery 242 when $V_{BUS}$ and $V_{SC}$ are no longer available (such as when a portable device is disconnected from a charging power source).

Figure 2D:
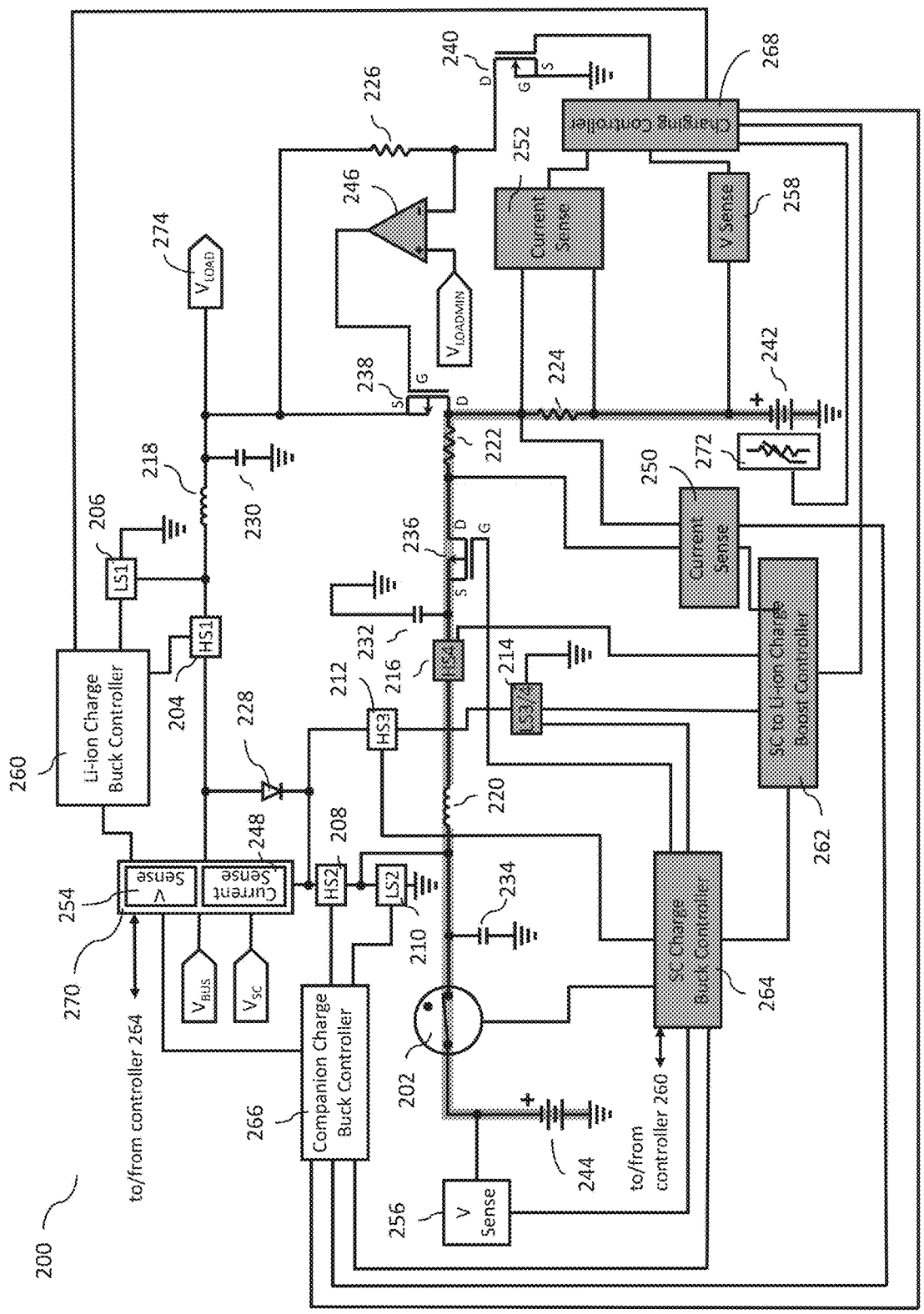
FIG. 2D is a schematic diagram illustrating the configuration of the switch-mode power system of FIG. 1 that enables the discharging of the SC.

FIG. 2D shows a configuration of switch-mode power system 200 wherein a path to enable the discharging of SC 244 so as to charge Li-ion battery 242. Switch 202 is closed, and switch LS3/4 (214) and HS4 (216) operate in boost mode, and p-channel FET 236 is placed in a conductive state by SC to Li-ion charge controller 262. This permits current to flow from SC 244 through inductor 220 and P-channel FET 236. Charging controller 268 operates to place n-channel FET 240 in a non-conductive state, this enables pull-up resistor 226 as to present a pull-up voltage at the negative terminal of comparator 246. pull-down the voltage evident at the negative terminal of comparator 246. This pull-up voltage, when compared to a minimum load voltage, results in a low state at the output of comparator 246 and the gate of p-channel FET 238. This places p-channel FET 238 in a conductive state, thereby keeping the $V_{LOAD}$ terminal 274 powered from SC 244 while charging the battery 242. Throughout the discharge process the voltage at battery 242 and the current flowing through resistor 224 are monitored by charging controller 268. This enables charging controller 268 to monitor the depletion of SC 244, and if needed, limit the flow of current to a level appropriate for battery 242. Charging controller 268 may also receive information from a thermistor or other temperature sensing device 272 positioned to monitor the temperature of Li-ion battery 242, enabling the power delivered to Li-ion battery 242 from SC 244 to be modulated as a function of that temperature.

Figure 2E:
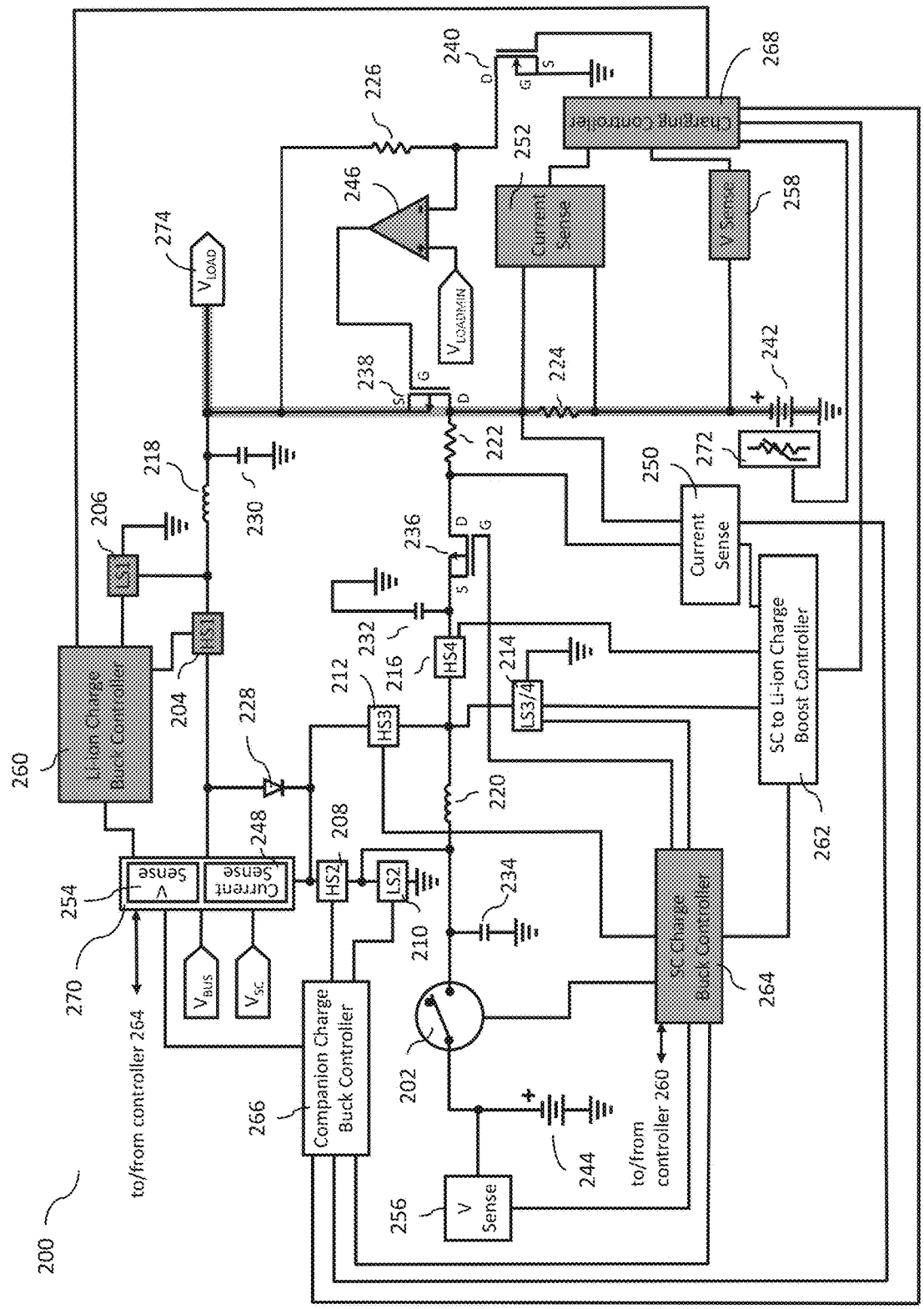
FIG. 2E is a schematic diagram illustrating the configuration of the switch-mode power system of FIG. 1 that enables the discharging of the Li-ion battery.

FIG. 2E shows a configuration of switch-mode power system 200 wherein a path to enable the discharging of Li-ion battery 242 to a load is established. Switch 202 is closed and switches HS4 (216) and LS3/4 (214) are modulated by SC to Li-ion Charge Boost Controller 262 to regulate the voltage evident at inductor 220 and the current allowed to flow through inductor 220. SC Charge Buck Controller 264 places p-channel FET 236 in a non-conductive state so as to prohibit the flow of current therethrough. Charging controller 268 operates so to keep the n-channel FET 240 in a non-conductive state and to pull-up the voltage evident at the negative terminal of comparator 246. This pull-up voltage, when compared to a minimum load voltage, results in a low voltage at the output of comparator 246 and the gate of p-channel FET 238. This places p-channel FET 238 in a conductive state, thereby permitting current flow from the positive terminal of battery 242, through current-sense resistor 224 and p-channel FET 238 to the $V_{LOAD}$ output terminal 274. Throughout the discharge process the voltage at battery 242 and the current flowing through resistor 224 are monitored by charging controller 268. This enables charging controller 268 to monitor the depletion of battery 242, and if needed, limit the flow of current to a level appropriate for both battery 242 and the load connected to terminal 274.

Figure 2F:
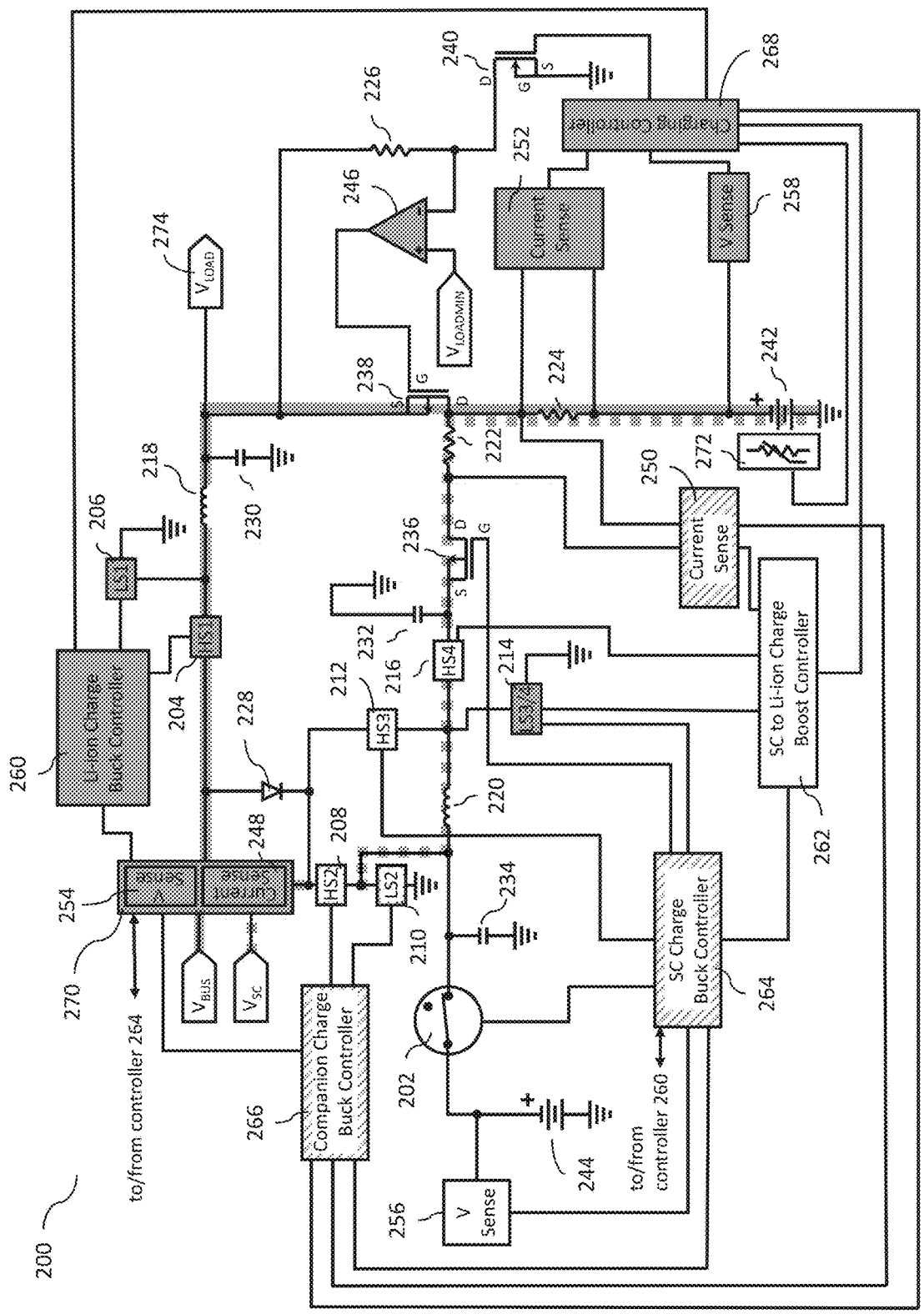
FIG. 2F is a schematic diagram illustrating the configuration of the switch-mode power system of FIG. 1A that enables the enhanced charging of the Li-ion battery.

The disclosed system is also capable of enabling a configuration that provides for enhanced charging of Li-ion battery 242 (see FIG. 2F). This enhanced charging mode utilizes power from both $V_{BUS}$ and $V_{SC}$. The path from $V_{SC}$ to Li-ion battery 242 is highlighted by a dotted line, and the controllers utilized are highlighted with diagonal lines. The path from $V_{BUS}$ to Li-ion battery 242 is highlighted by a solid line, and the controllers utilized are highlighted with solid shading.

To create the charging path fed by $V_{SC}$, Companion Charge Buck Controller 266 instructs SC charge buck controller 264, which in turn instructs supply voltage controller 270 to connect $V_{SC}$ to the input of HS2 (208). SC charge buck controller 264 opens switch 202, places p-channel FET 236 into a conductive state and switch HS3 (212) in an "off" state. Companion Charge Buck Controller 266 then modulates switches HS2 (208) and LS2 (210) to regulate the voltage evident at the source of p-channel FET 236 as well as the current allowed to flow through that FET. Capacitor 232 serves to smooth the voltage evident at the source of FET 236. Current flows through FET 236, through current-sense resistors 222 and 224 and into the positive terminal of Li-ion battery 242. The current flowing from $V_{SC}$ to Li-ion battery 242 is monitored by current sense resistor 222 and current sensor 250, thereby providing information that is utilized by companion charge buck controller 266 to modulate the power flowing into battery 242. Companion charge buck controller 266 may also receive information from a thermistor or other temperature sensing device (connection not illustrated) positioned to monitor the temperature of SC 244, enabling the power delivered to Li-ion battery 242 to be modulated as a function of that sensed temperature.

The charging path fed by $V_{BUS}$ is established by Li-ion charge buck controller 260 instructing supply voltage controller 270 to connect $V_{BUS}$ to the input of HS1 (204). Switches HS1 (204) and LS1 (206) are then modulated by Li-ion charge buck controller 260 to regulate the voltage evident at inductor 218 and the current allowed to flow through inductor 218 to the source of p-channel FET 238. Capacitor 230 serves to smooth the regulated voltage at the source of p-channel FET 238. In case of battery 242 being in the state of requiring application of a pre-charge state (a condition that is typically associate with a battery voltage below 2.8V-3V), charging controller 268 operates to switch n-channel FET 240 so as to pull-down the voltage evident at the negative terminal of comparator 246. This pull-down voltage, when compared to a minimum load voltage, results in a low voltage at the output of comparator 246 and the gate of p-channel FET 238. This places p-channel FET 238 is a non-conductive state, thereby isolating the battery 242 from the $V_{LOAD}$ and charge path from Li-ion Buck Controller 260. This enables the system to operate as being supplied by the Li-Ion Buck controller 260 charging path while at the same time battery being preconditioned by much smaller current via Companion Charge Buck Controller 266. Otherwise, if battery 242 is above the 'pre-charge-state', controller 268 operates to switch n-channel FET 240 in the OFF state which in turn enables the comparator 246 to operate in either switch or throttling mode permitting current flow through current-sense resistor 224 and into the positive terminal of Li-ion battery 242. Throughout the charging process switches HS1 (204) and LS1 (206) are controlled by Li-ion charging buck controller in accordance with known switch mode power system conventions so as to maintain an acceptable charging voltage level. The current passing through current sensing resistor 224 is monitored by charging controller 268 during the charging of Li-ion battery 242. This serves to enable charging controller 268 to monitor and modulate the current flowing through p-channel FET 238 via comparator 246. The current level being a function of the properties and capacity of Li-ion battery 242. As previously sated, charging controller 268 may also receive information from a thermistor or other temperature sensing device 272 positioned to monitor the temperature of Li-ion battery 242. This enables the power delivered to Li-ion battery 242 from $V_{BUS}$ to be modulated as a function of that temperature.

The disclosed invention offers many advantages, including the ability to fully charge SC 244 in a very short period of time. This quickly attained "boost charge" can then be utilized to charge Li-ion battery 242 after the device housing the disclosed system is disconnected from a power source ($V_{BUS}$ and or $V_{SC}$). The ability of the disclosed system to utilize a minimal number of components so as to enable the switchable establishment of configurations supporting charging of Li-ion battery 242 and SC 244, either separately or simultaneously, by an external power source ($V_{BUS}$ and/or $V_{SC}$), the discharging of the Li-ion battery to a load and the discharging of the SC to charge the Li-ion battery makes the system well-suited for portable applications where both space and cost need to be minimized.

Although the invention herein has been described with reference to particular embodiments, it is to be understood that these embodiments are merely illustrative of the principles and applications of the present invention. For example, the battery may be Li-ion, Ni metal hydride, or other high-current density power storage technology. The SC may be any cell having a low-current energy density that permits it to be charged in a significantly shorter period than the battery utilized in the system. It is therefore to be understood that numerous modifications may be made to the illustrative embodiments and that other arrangements may be devised without departing from the spirit and scope of the present invention as defined by the appended claims.

The invention claimed is:

1. A switched mode power system comprising:
   at least one controller;
   a primary power input;
   a secondary power input;
   a primary rechargeable battery;
   a secondary rechargeable battery having a lower current density than the primary rechargeable battery;
   a first switchable path, responsive to the at least one controller and adapted for charging the primary rechargeable battery from the primary power input, comprising a first buck switch, a first boost switch, a first inductor and a first capacitor;
   a second switchable path, responsive to the at least one controller and adapted for charging the secondary rechargeable battery from the secondary power input, comprising a second buck switch, a second boost switch, a second inductor and a second capacitor;
   a third switchable path, responsive to the at least one controller and adapted for discharging the secondary rechargeable battery into the primary rechargeable battery, comprising the second inductor; and
   a fourth switchable path, responsive to the at least one controller and adapted for discharging the primary rechargeable battery to a load.

2. The switched mode power system of claim 1, wherein the third switchable path further comprises a switch responsive to the at least one controller and adapted to isolate the secondary rechargeable battery from the load.

3. The switched mode power system of claim 1, wherein the third switchable path further comprises a switch responsive to the at least one controller and adapted to isolate the secondary rechargeable battery from the load.

4. The switched mode power system of claim 1, wherein the third switchable path further comprises a switch responsive to the at least one controller and adapted to isolate the secondary rechargeable battery from the primary power input.

5. The switched mode power system of claim 1, wherein the third switchable path further comprises a switch responsive to the at least one controller and adapted to isolate the secondary rechargeable battery from the secondary power input.

6. The switched mode power system of claim 1, wherein the fourth switchable path further comprises a switch responsive to the at least one controller and adapted to isolate the primary rechargeable battery from the secondary rechargeable battery.

7. The switched mode power system of claim 1, further comprising a fifth switchable path comprising the second inductor, responsive to the at least one controller and adapted for charging the primary rechargeable battery from the secondary power input.

8. The switched mode power system of claim 7, wherein the fifth switchable path further comprises a switch responsive to the at least one controller and adapted to isolate the secondary rechargeable battery from fifth switchable path.

9. The switched mode power system of claim 7, wherein the at least one controller is adapted to simultaneously enable the first switchable path and the fifth switchable path.

10. The switched mode power system of claim 1, wherein the at least one controller is responsive to a temperature sensor adapted to sense a temperature of the primary rechargeable battery.

11. The switched mode power system of claim 1, wherein the at least one controller is adapted to simultaneously enable the first and second switchable paths.

12. A method for controlling a switch mode power system, the method comprising the steps of:
   switchably connecting a primary rechargeable battery to a primary power input via a first charging path comprising a first buck switch, a first boost switch, a first inductor and a first capacitor;
   switchably connecting a secondary rechargeable battery to a secondary power input via a second charging path comprising a second buck switch, a second boost switch, a second inductor and a second capacitor;
   switchably connecting the secondary rechargeable battery to the primary rechargeable battery via a first discharge path comprising the second inductor; and
   switchably connecting the primary rechargeable battery to a load via a second discharge path.

13. The method of claim 12, wherein the first discharge path further comprises a switch adapted to isolate the secondary rechargeable battery from the load.

14. The method of claim 12, wherein the first discharge path further comprises a switch adapted to isolate the secondary rechargeable battery from the load.

15. The method of claim 12, wherein the first discharge path further comprises a switch adapted to isolate the secondary rechargeable battery from the primary power input.

16. The method of claim 12, wherein the first discharge path further comprises a switch adapted to isolate the secondary rechargeable battery from the secondary power input.

17. The method of claim 12, wherein the second discharge path further comprises a switch adapted to isolate the primary rechargeable battery from the secondary rechargeable battery.

18. The method of claim 12, wherein the second discharge path further comprises a switchable path adapted for charging the primary rechargeable battery from the secondary power input.

19. The method of claim 18, wherein the switchable path further comprises a switch responsive to at least one controller and adapted to isolate the secondary rechargeable battery from the switchable path.

20. The method of claim 19, wherein the at least one controller is adapted to simultaneously enable the switchable path.

21. The method of claim 19, wherein the at least one controller is responsive to a temperature sensor adapted to sense a temperature of the primary rechargeable battery.

22. The method of claim 12, wherein the first charging path is switchably connected to the primary rechargeable battery simultaneously with the second charging path being switchably connected to the secondary rechargeable battery.

* * * * *